United States Patent
Gautier

(10) Patent No.: US 8,209,735 B2
(45) Date of Patent: Jun. 26, 2012

(54) AUTOMATIC IDENTIFICATION OF A SET-TOP BOX USER TO A NETWORK

(75) Inventor: Taylor S. Gautier, Foster City, CA (US)

(73) Assignee: At Home Bondholders' Liquidating Trust, New York, NY (US)

( * ) Notice: Subject to any disclaimer, the term of this patent is extended or adjusted under 35 U.S.C. 154(b) by 653 days.

(21) Appl. No.: 12/101,923

(22) Filed: Apr. 11, 2008

(65) Prior Publication Data

US 2008/0216146 A1   Sep. 4, 2008

Related U.S. Application Data

(63) Continuation of application No. 10/647,032, filed on Aug. 21, 2003, now Pat. No. 7,376,751, and a continuation of application No. 09/569,967, filed on May 11, 2000, now Pat. No. 6,618,858.

(51) Int. Cl.
*H04N 7/173* (2011.01)

(52) U.S. Cl. ............... 725/131; 725/1; 725/30; 725/100; 725/109; 725/110; 725/139; 725/151

(58) Field of Classification Search .............. 725/25–30, 725/1, 100, 109, 110, 131, 139, 151
See application file for complete search history.

(56) References Cited

U.S. PATENT DOCUMENTS

| | | | |
|---|---|---|---|
| 5,396,546 A * | 3/1995 | Remillard | 379/93.24 |
| 5,659,350 A * | 8/1997 | Hendricks et al. | 725/116 |
| 5,710,918 A | 1/1998 | Legarde et al. | |
| 5,721,908 A | 2/1998 | Legarde et al. | |
| 5,845,260 A * | 12/1998 | Nakano et al. | 705/17 |
| 5,922,049 A | 7/1999 | Radia et al. | |
| 5,991,800 A | 11/1999 | Burke et al. | |
| 6,018,768 A | 1/2000 | Ullman et al. | |
| 6,163,272 A * | 12/2000 | Goode et al. | 725/30 |
| 6,178,407 B1 * | 1/2001 | Lotvin et al. | 705/14.73 |
| 6,182,131 B1 * | 1/2001 | Dean et al. | 709/222 |
| 6,338,094 B1 | 1/2002 | Scott et al. | |
| 6,349,410 B1 | 2/2002 | Lortz | |
| 6,351,467 B1 | 2/2002 | Dillon | |

(Continued)

FOREIGN PATENT DOCUMENTS

| | | |
|---|---|---|
| EP | 1 067 772 A | 1/2001 |
| EP | 1 067 772 | 10/2001 |
| WO | WO 00 30345 | 5/2000 |
| WO | WO 00/30345 A | 5/2000 |

OTHER PUBLICATIONS

Examination Report dated Apr. 27, 2009; Canadian Application No. 2, 413, 232.

(Continued)

*Primary Examiner* — Pankaj Kumar
*Assistant Examiner* — Mulugeta Mengesha
(74) *Attorney, Agent, or Firm* — Beyer Law Group LLP

(57) ABSTRACT

Methods, apparatus, and computer-readable media are disclosed for enabling a user of data services over a network to automatically register for such services by plugging in a set-top box, such as an advanced set-top box, or other IP clients such as a Web pad, and entering certain information through a member services screen. The invention also allows a user to have several accounts distributed over several set-top boxes or IP clients and have all accounts map to a single network identity. That is, it allows a user to have multiple viewer identities for different purposes yet have all of them map back to a single network identity for that user.

8 Claims, 6 Drawing Sheets

U.S. PATENT DOCUMENTS

| | | | |
|---|---|---|---|
| 6,351,773 B1 | 2/2002 | Fijolek | |
| 6,396,531 B1 | 5/2002 | Gerszberg et al. | |
| 6,459,427 B1 | 10/2002 | Mao et al. | |
| 6,463,533 B1 | 10/2002 | Calamera et al. | |
| 6,490,727 B1 | 12/2002 | Nazarathy et al. | |
| 6,530,086 B1 | 3/2003 | Brodigan | |
| 6,543,052 B1 | 4/2003 | Ogasawara | |
| 6,618,858 B1 * | 9/2003 | Gautier | 725/132 |
| 6,754,904 B1 * | 6/2004 | Cooper et al. | 725/32 |
| 6,934,391 B1 * | 8/2005 | Linkola et al. | 380/247 |
| 6,950,441 B1 * | 9/2005 | Kaczmarczyk et al. | 370/467 |
| 7,185,355 B1 * | 2/2007 | Ellis et al. | 725/46 |
| 7,590,993 B1 * | 9/2009 | Hendricks et al. | 725/35 |
| 2002/0057298 A1 * | 5/2002 | Wassom et al. | 345/825 |
| 2004/0045031 A1 * | 3/2004 | Gautier | 725/110 |
| 2004/0231003 A1 * | 11/2004 | Cooper et al. | 725/135 |

OTHER PUBLICATIONS

Examination Report dated Jul. 13, 2009; App. No. 01 937 287.9 EPC.
Examination Report dated Apr. 27, 2009; Canadian App. No. 2,413,232.
Partial International Search Report dated Dec. 11, 2006; App. No. 01 937287.9 EPC.
European Office Action dated Dec. 11, 2006 from corresponding European Application No. 01 937 287.9.
International Search Report dated Feb. 13, 2002 from corresponding International Application No. PCT/US01/15147.
Evain J-P, "The Multimedia Home Platform" EBU Review-Technical, European Broadcasting Union, Brussels BE, No. 275, Mar. 21, 1998, pp. 4-10.
Herfet T. et al., "Internet-TV—Konvergenz Von Diensten Und Geraeten?" Fernseh Und Kinotechnik, VDE Verlag GmbH. Berlin, DE, vol. 52, No. 1/2, Jan. 1998, pp. 58-62, 64.
Wall W. E., "An Advanced Video Platform for the Cable Industry" Proceedings of the International Workshop on Community Networking, Sep. 11, 1997, pp. 31-33.
PowerTV Inc.: "PowerTV Operating System Overview—Release 2.2".
D' Juna et al., "A Single Chip Universal Cable-Set-Top Box/Modem Transceiver" IEEE Journal of Solid-State Circuits, vol. 34, No. 11, Nov. 1999, 1647-1660.
European Office Action dated Jan. 31, 2011 from European Application No. 01937287.9.

* cited by examiner

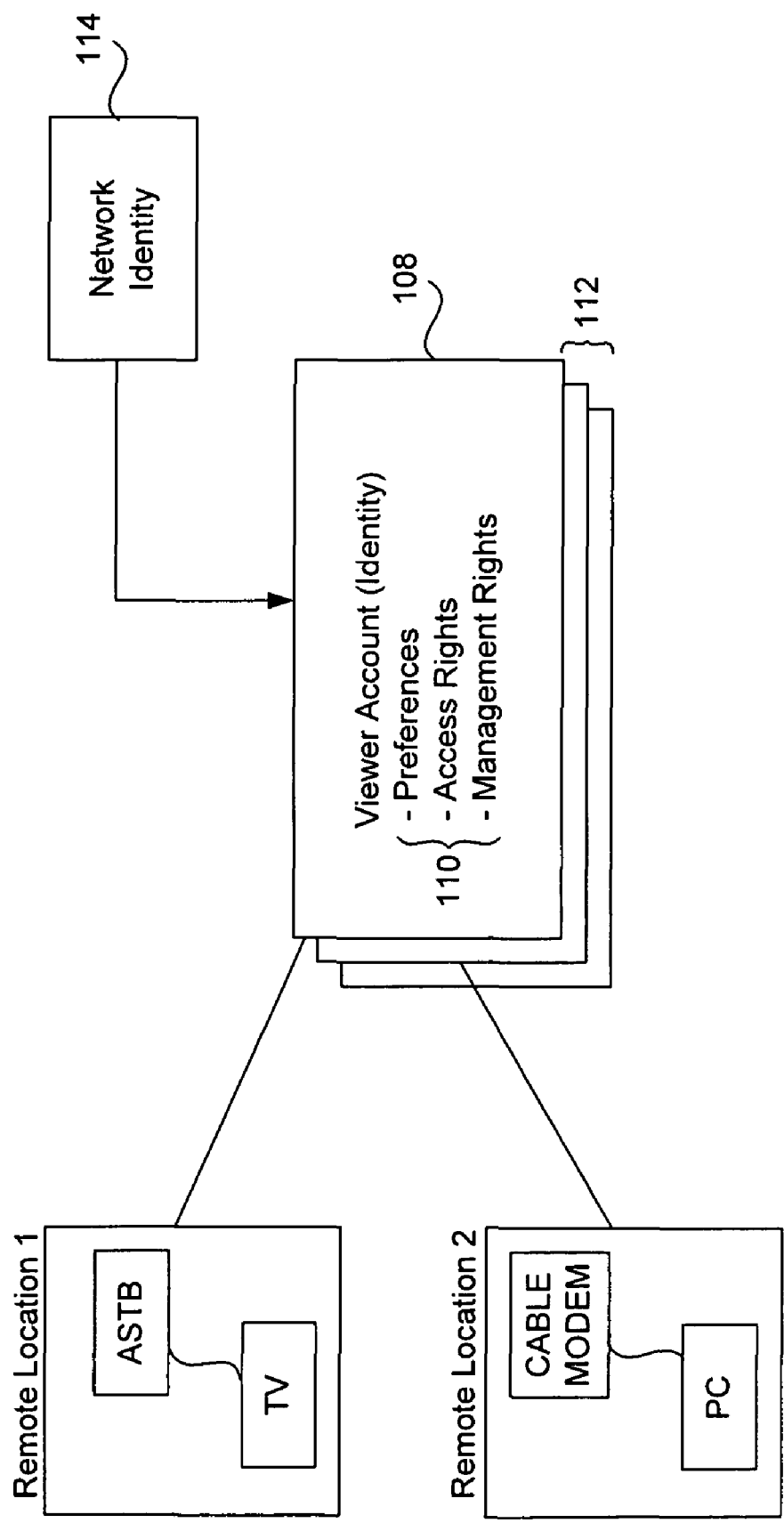

AUTOMATIC IDENTIFICATION OF A SET-TOP BOX USER TO A NETWORK

This application is a continuation of U.S. application Ser. No. 10/647,032, which is a continuation of U.S. Pat. No. 6,618,858, both of which are incorporated herein by reference.

BACKGROUND OF THE INVENTION

1. Field of the Invention

The present invention relates generally to data communications and network infrastructure. More specifically, it relates to registering and identifying users of advanced set-top boxes for delivering and transmitting data in a network.

2. Discussion of Related Art

Over the past several years, there has been a proliferation of users desiring access to various types of data. This data includes data over the Internet (e.g., Web content and email) and data related to television settings, preferences, and rights. Presently, a significant portion of these users, although wanting to "get online," are not necessarily proficient at or accustomed to using general-purpose computers, and presently many may not have the need or the resources to be proficient. As a practical matter, the vast majority of people who desire to use and benefit from the Internet must have access to a computer or some type of terminal (e.g. an Internet "kiosk") to logon. This greatly limits the number of users who can use and contribute to the Internet.

Internet and other digital data have typically been delivered using telephone lines connected to servers and modems which feed the data to client or stand-alone computers. Recently, however, other existing and newly built networks are being used to deliver such data. Although not the only one, one of the more notable of these new delivery systems are cable television plants working in conjunction with either established or newly developed (e.g. all-fiber optic) back bone networks. Using the inherent two-way data transmission capability of existing hybrid fiber-coaxial (HFC) cable television plants, delivery of data using cable to consumers is on the rise. Data can be delivered at much faster speeds than speeds attainable using copper telephone wires. Other high-speed data delivery means include Digital Subscriber Lines (DSL) and high-speed wireless access, among others.

With cable television plants, currently, in order to receive and transmit data (e.g., Web content, email, etc.) on the cable plant, the user needs a cable modem. A cable modem can digitize an incoming analog signal (on the HFC downstream) and convert digital data to analog signals for transmission (on the HFC upstream). Generally, data is sent to and received by a cable modem termination system (CMTS) located at the headend of the cable television plant.

A cable modem can be a separate device or be a component incorporated in, for example, a cable television set-top box, such as the type many subscribers to cable television already have. A set-top box having an internal modem and other components can be referred to as an advanced set-top box or ASTB. By using an advanced set-top box, a user with access to cable television can also access other data sources, such as the Web or remote servers or networks having data of interest to the user. This assumes that the HFC plant in the user's geographical area has been upgraded for two-way digital data transmission. The cable modem device or component in the ASTB can be connected to some customer premise equipment such as a television, computer, Web pad or other Internet Protocol (IP) clients. As described earlier, many households and users may not have a personal computer for accessing the Internet or other remote sources of data. However, with an advanced set-top box having a cable modem, a user can receive and transmit data using a television and keyboard.

One of the goals of using an advanced set-top box or other IP-enabled device for accessing external digital data is to enable a broader segment of the population (i.e. those having access to cable television) to get online in a simple and efficient manner. Presently, getting online can be a complex and intimidating task for those who are not computer savvy or for those not interested in the intricacies of the Internet or of user interface issues (e.g. using a browser or using an Internet search engine). In a simple example, a user with a common name may not want an email address having several numbers or characters appended to his name just to make it unique. In another example, a user may want to easily change his logon name or keep several simple and intuitive email addresses for different purposes. In yet another example, a user may want to update a login name for an electronic wallet. Currently, each login name would have to be complex and difficult to understand to ensure it's uniqueness within the network; thus preventing the user from having a simple and easy to use identifier.

The underlying complexity and options not of interest to the user are nevertheless displayed to the user, thereby cluttering the user interface and complicating an otherwise simple process in most cases. Many user interfaces today present too many irrelevant options and too much data to a user who may have relatively simple needs or the user interface is of such a nature that it is not capable of being simplified.

Presently, a user using an advanced set-top box for Internet and television access is typically confined to using that specific set-top box. That is, the user is unable to logon to other set-top boxes. The user is also limited with respect to the number of logon identifiers he can maintain. In addition, if the user desires to login from another ASTB, he would have to repeat the login process.

Therefore, it would be desirable to allow a user to simply "plug-in" an advanced set-top box, register itself with the operator, and then set up profiles and other settings in a simple and intuitive manner. These profiles and settings can pertain to Internet and other digital data as well as television settings. It would also be desirable to allow a user to maintain several logon identifiers (chosen by the user) such as email addresses and passwords and allow the user to change logon information as desired without having to derive a unique name each time and without having to go through a lengthy process with the service provider. In addition, the underlying complexity of the network would be kept hidden from the user by allowing the user to choose a simple, meaningful logon name. It would also be desirable to unite access PINs for pay-per-view access and user identification for network services access.

SUMMARY OF THE INVENTION

According to the present invention, methods, apparatus, and computer-readable media are disclosed for enabling a user of data services over a network to automatically register for such services by plugging in a set-top box, such as an advanced set-top box, and entering certain information through a member services screen. The present invention also allows a user to have several accounts distributed over several set-top boxes and various IP clients (e.g. PDAs, Web pad, and other devices having IP connectivity) and have all accounts map to a single network identity. That is, it allows a user to have multiple viewer identities for different purposes yet have all of them map back to a single network identity for that user.

In one aspect of the present invention, a method of automatically registering a set-top box in a network includes an initial step of creating a subscriber data record and generating a registration code where the data record holds data relating to a subscriber and the registration code is given to the subscriber. IP connectivity is established between the set-top box and an operator. This connectivity can be indicated by the presentation of a data input screen, such as an operator member services screen, to the subscriber, once the set-top box is plugged in. A unique subscriber or user identifier is generated and is transmitted to and resides on the set-top box. A binding is then made between the set-top box and a corresponding network account that is under control of the operator and resides on the network-server side of the network. The binding associates the unique subscriber identifier with the network account. The unique subscriber identifier is not known to the user, is unperceptible to the user, and is immutable by the user.

In another aspect of the present invention, a method of enabling a user to keep multiple accounts or profiles on different set-top boxes, including advanced set-top boxes and cable modems, is described. Such accounts can also be maintained on other types portable IP clients. A subscriber can create a first viewer account on a set-top box at one location where the account contains one set of settings, preferences, and a unique identity that belongs to the subscriber. The same subscriber can create a second viewer account on a set-top box at another location where the second account contains another set of settings and preferences, but contains the same unique identity as in the first viewer account. The two viewer accounts, both belonging to the same subscriber, are mapped to a single network account where the network account contains a network identity. This network identity is associated with the unique identity of the subscriber which is contained in each of a subscriber's or user's viewer accounts. A communication link is established between the box and a network operator using the subscriber's unique identifier and its corresponding network identity. The network identity contains the subscriber's unique identity that links to a network-side set of information.

BRIEF DESCRIPTION OF THE DRAWINGS

The invention will be better understood by reference to the following description taken in conjunction with the accompanying drawings in which:

FIG. 1 is a block diagram showing components and data for a many-to-one mapping in a network configuration in accordance with one embodiment of the present invention.

DETAILED DESCRIPTION

Figure 2A:
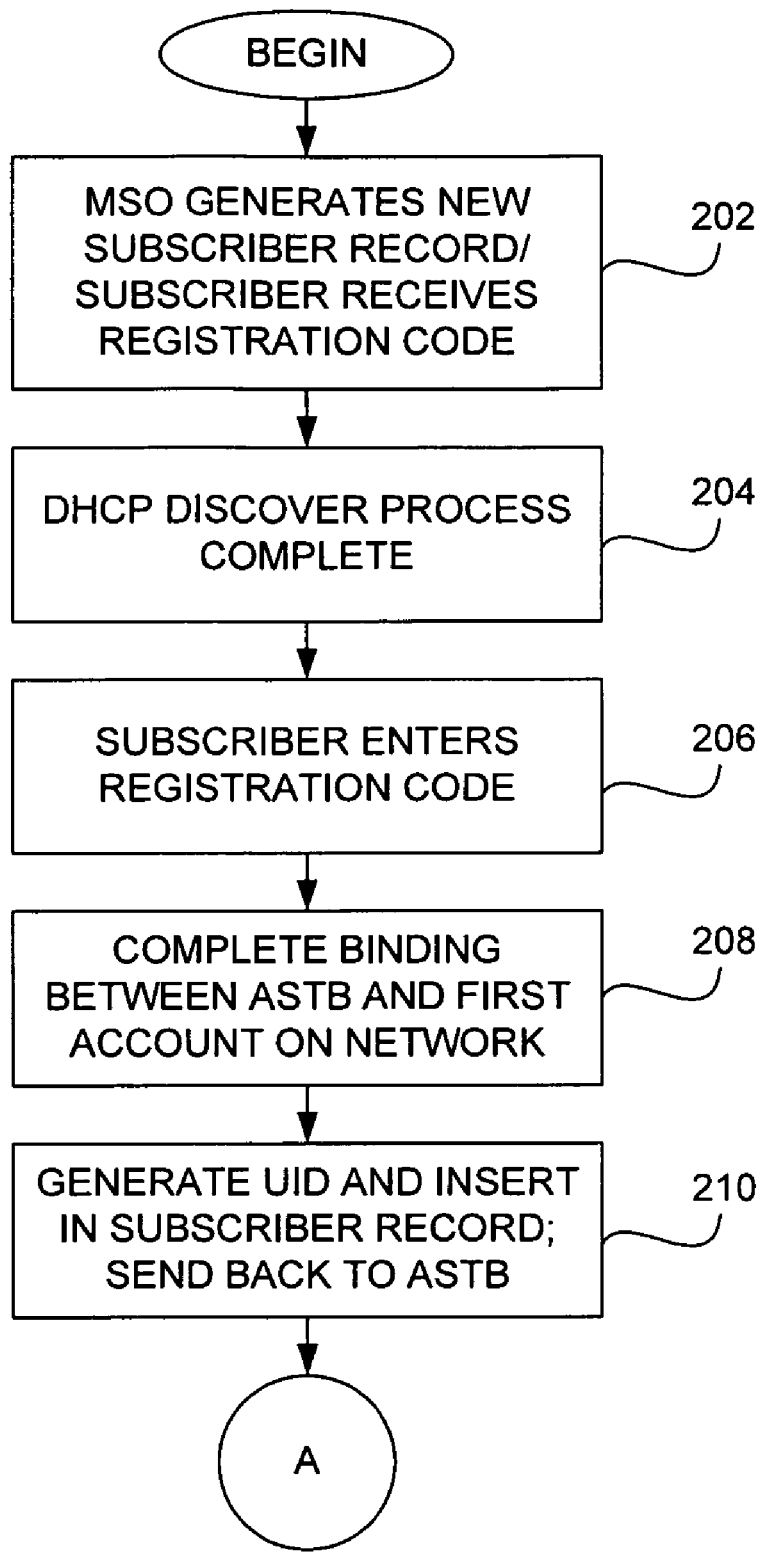
FIGS. 2A and 2B are flow diagrams of a process for establishing an association between a user identifier and a network identifier in accordance with one embodiment of the present invention.

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

In accordance with one embodiment of the present invention, there is provided a system and process for a user to have multiple accounts on multiple advanced set-top boxes (ASTBs) and have all accounts map to one network identity as described in the various figures. To further illustrate the foregoing, FIG. 1 is a block diagram showing components and data for a many-to-one mapping in a network configuration in accordance with one embodiment of the present invention. A single TV viewer ("Viewer"), a person viewing a monitor, such as a TV or a computer, connected to an ASTB, can have multiple Viewer Identities, also referred to as Viewer Accounts. These multiple Viewer Identities can be distributed among different ASTBs. As will be described in greater detail below, these multiple or single Viewer Identities map to a single Network Identity. A Viewer Account is an account that is local to or resides on a particular ASTB which stores the Viewer's preferences, video permissions, email and Internet information, and a UID, described in greater detail below. There can be several ASTBs at different locations, or at the same location (e.g. in different rooms in the same house), each having a Viewer Account for the same Viewer. As will be described below, one feature of the present invention is that the multiple Viewer Accounts or Identities map to a single Network Identity.

On the left side of FIG. 1 is an ASTB 102 in a home connected to a television and a cable modem 104 in a remote location connected to a personal computer. This type of configuration may arise if a Viewer travels and desires cable television preferences and high-speed Internet access from various physical locations. In another common configuration, there can be multiple ASTBs in a single location, such as in a house, with a particular Viewer having different Viewer Accounts on the different boxes, each box having a different set of preferences and authorities. The concept of a single Viewer having one or more Viewer Identities all mapping to a single Network Identity is unchanged in these and other configurations. In yet another configuration the user can have Viewer Accounts on other types of IP clients, such as Web pads, PDAs, cellular phones, Web appliances, and other handheld or portable devices operating under IP. The concepts of the present invention, including the UID mapping to a single NID, described in great detail below, can be "applied" to configurations including these IP devices. The description below only uses an ASTB as example to illustrate the concepts of the invention. The present invention ties many services together so that a user can always see "his" data regardless of what device is being used or where he is.

A Viewer Account 108 contains a set of information 110 residing on the multiple ASTBs and cable modems. In the described embodiment, information 110 includes Viewer preferences, access rights, and management rights. In another embodiment, information 110 can be different on the various ASTBs but still belong to the same Viewer and, importantly, still map to a single Network Identity. Thus, a Viewer can have several Viewer Identities 112 all of which map to a single Network Identity 114 as shown in FIG. 1. In the described embodiment, preferences in information 110 are items of data that the user can change that effect the Viewer's experience or are data items stored by the network on the Viewer's behalf. Examples of such data include favorite channels, color settings, address book entries, and so on. Access rights describe the ability of a Viewer to access certain services. Examples of specific access rights include blocked channels (i.e., parental control), access to Internet sites, and access to particular email addresses.

Figure 2B:
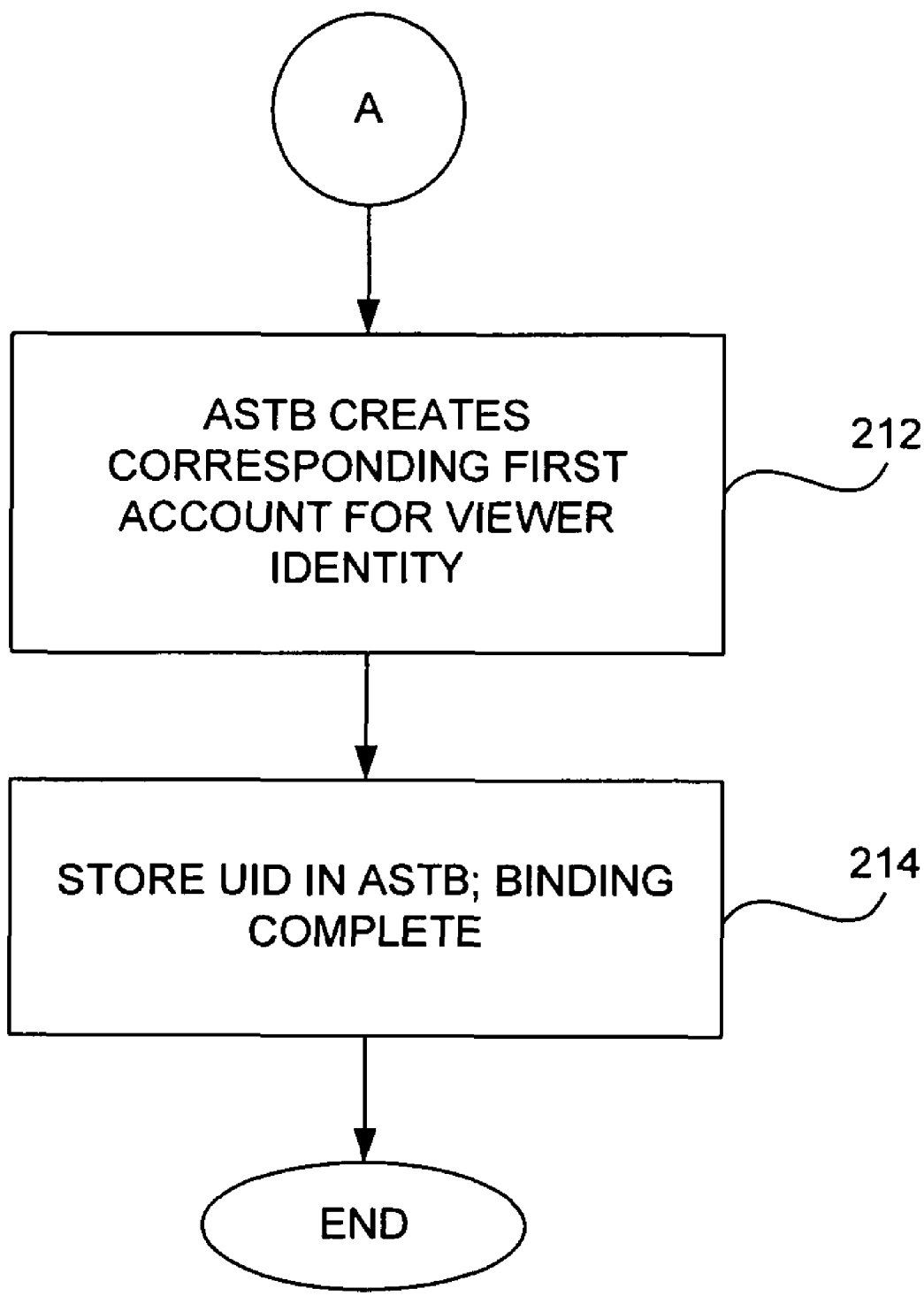

FIG. 2 is a flow diagram of a process for establishing a binding or association between a user identifier (UID) and a network identifier (NID) in accordance with one embodiment of the present invention. At a step 202, the customer or subscriber desiring access to network services through an ASTB calls a multiple service operator (MSO) which can provide television and Internet services, among other data services. This call is typically made before the subscriber is in possession of an ASTB since he wants to be sure that his geographical area is able to support such services. The MSO, upon getting the call, generates a new subscriber record. In the described embodiment, the new subscriber record contains general information identifying the customer such as name, address, and so on. In particular, the MSO creates a registration code for the new customer which is included in the subscriber record and can be used as a key to searching for a particular record. In the described embodiment, this registration code, an alphanumeric string, is typically generated while the customer is on the phone with the MSO and is given to the customer. The customer saves the registration code for use later in the sign-up process.

At step 204 the customer, now in possession of an advanced set-top box, initializes and sets up the ASTB. The customer can obtain the ASTB by purchasing it at a retail store, for example, or having it delivered by the MSO via a "truck roll" where an MSO employee or agent comes to the subscriber's home or premises. In step 204, the ASTB is connected to the cable plant through the normal premise cable outlet. Once plugged in, the ASTB goes through an initialization process in which a normal DHCP process occurs to establish IP connectivity between the ASTB and a member services component of the MSO.

At step 206 a member services screen is presented to the customer indicating that there is IP connectivity between the ASTB, the attached equipment (e.g. TV or PC), and the MSO. In the described embodiment, the new customer can only access the member services home page of the MSO so that the customer can be verified and fully registered before having access to other services. The customer enters the registration code which it obtained at step 202. At step 208, upon receiving the registration code, the MSO uses it to search for a corresponding subscriber record.

Also at step 208, the network validates the subscriber by ensuring that the registration code matches the information obtained for the subscriber in the subscriber record. The information obtained at step 208 should match the information provided initially at step 202 when the subscriber called the MSO. When this validation is successfully completed, a binding between the ASTB and information on a first account on the network is established. At this stage, the network knows of the subscriber and can, therefore, perform the binding. By establishing this connectivity, there is a binding between a viewer account or identity belonging to the subscriber and a newly created NID. Thus, at step 208 a correct subscriber is connected to a correct NID.

At step 210 the network generates a user identifier or UID. The UID is inserted into the subscriber record created in step 202. The subscriber record is transmitted back to the ASTB over the network. In the described embodiment, the creation and "value" of the UID is unbeknownst to the subscriber. It is an identifier that is used strictly by the network to map a particular subscriber, regardless of how that subscriber is logged on (e.g. email logon, chat logon, wallet service, etc.), to a network identity (NID). The UID is 1) opaque to the subscriber, 2) unchangeable by the subscriber (immutable), and, 3) not known to the subscriber.

At step 212 the ASTB creates a corresponding first account for the subscriber thereby creating a viewer identity on the ASTB (i.e. the "local" environment) that reflects the network identity (NID) created in step 210. At step 214, the UID received from the network is stored in the ASTB. Once the ASTB has stored the UID (of which the subscriber is not aware), a mapping between the UID and the NID is completed. This allows the subscriber to access multiple services under different user-chosen names from different ASTBs if desired. At this stage a new owner subscriber account is created and the network can use the UID to communicate with the ASTB.

Figure 3:
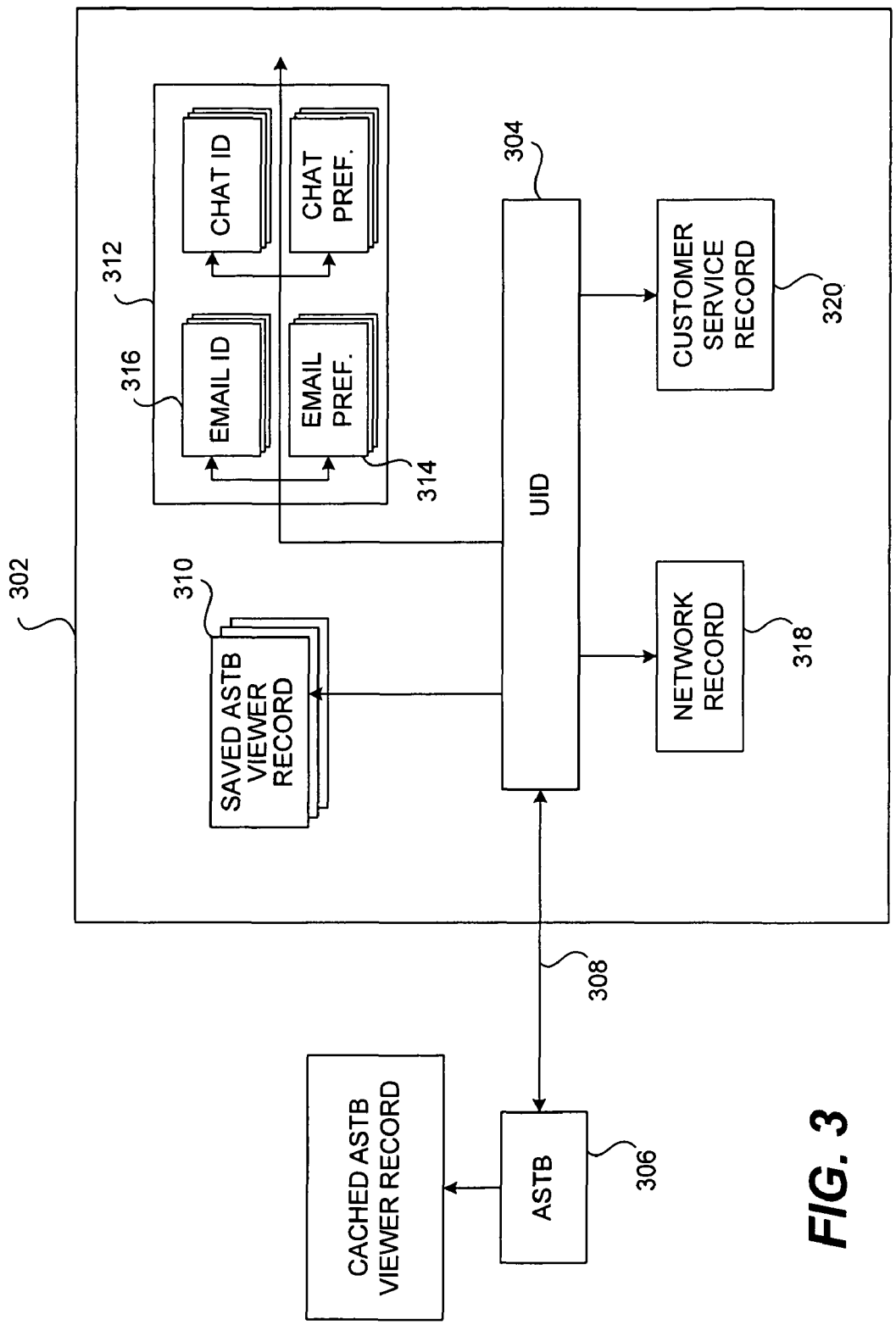
FIG. 3 is a block diagram showing data components included in a network identity in accordance with one embodiment of the present invention.

FIG. 3 is a block diagram showing data components included in a network identity in accordance with one embodiment of the present invention. An ASTB, such as local ASTB 108 in FIG. 1 is in communication with a network identity, such as network identity 114. In the described embodiment, NIDs can reside with the MSO or can be distributed in various locations as best determined by the MSO. In the described embodiment, a logical diagram of a network identity 302 has a UID 304 as its central data item. It is UID 304 that is used to communicate between ASTB 306 and network identity 302 as depicted by line 308

UID 304 is used to branch to various types of information as needed. One block of information is a saved ASTB Viewer record 310 that essentially matches the viewer information stored on the subscriber's ASTB. This includes information regarding access rights, administration rights, a TV name (a name the viewer uses to identify his account locally on the ASTB, typically a user's first name or nick name), the user's personal identification number or PIN, favorite channels, settings, preferences, and so on. This information is cached on the ASTB and some items can be changed by the user. By keeping this information on the ASTB, it is still available to the user if the network fails. There is generally one ASTB Viewer record 310 for each viewer. A subscriber who creates a first account is typically owner of the first account on the ASTB and is a viewer.

Another data component accessible by the UID are the various data services 312 provided by the MSO or other providers. The services include Internet email, chat services, Internet wallet services, among others. Each service in data services 312 typically has two components: preferences and identifiers. For example, a viewer can set certain preferences for his or her email service, including a password, which is stored as data component 314 and store one or more email identifiers or names in data component 316. A single viewer can have several identifiers for each service if desired as long as they are associated with a single UID. In the described embodiment, data components 314 and 316 can be changed by the viewer and can be physically distributed if needed.

Other types of data include a network record 318 for the viewer that includes administration and access rights of the viewer as also contained in saved ASTB viewer record 310. Also retrievable by UID 304 is a customer service record 320 maintained by the MSO containing data on the viewer such as the name of the person billed for that viewer's account, address, the viewer's password to login to the network, among other data. This information is typically maintained by a member services group of the MSO. UID 304 can also be used to access external services such as other vendor Web sites. Other services available from the ASTB are Web sites specifically geared or configured to resemble the look and feel of other services on the. This environment can be referred to as a "walled garden." This allows viewers registered with the ASTB to use certain services from Web sites on the Internet without having to leave the confined space of the services provided by the MSO. This is another way to keep access to services for viewers not accustomed to browsing the Internet simple and uncluttered. Such viewers will have access to external services but not have to learn or get used to a completely different interface or look and feel of the external sites. In other embodiments, additional data components can be linked to UID 304. It is helpful to note that UID 304 is the key data item that associates a viewer using an ASTB with NID 302, which includes all the data components described above.

Figure 4:
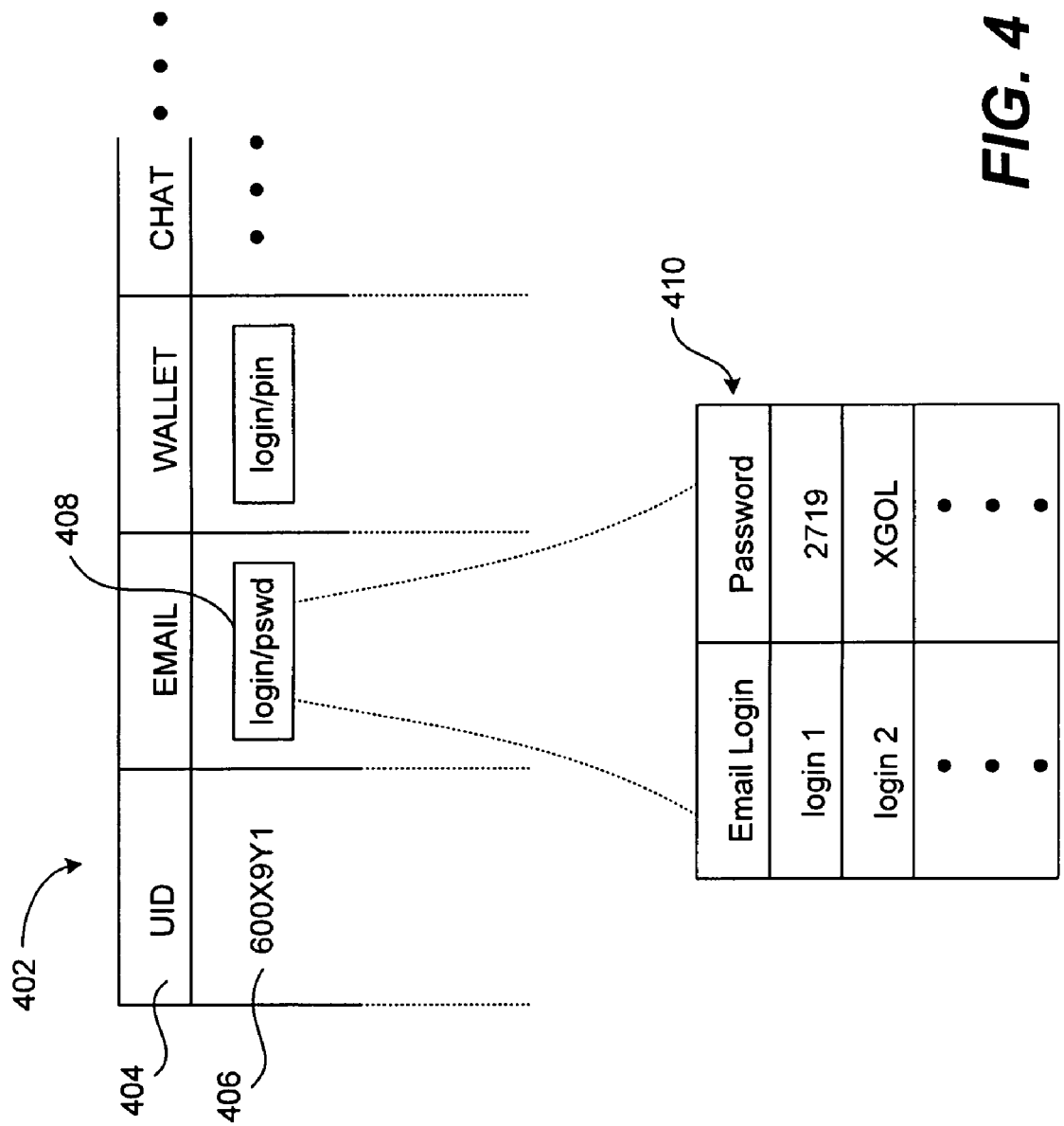
FIG. 4 is an illustration of a data structures used to retrieve information using a UID in accordance with one embodiment of the present invention.

When a viewer logs onto services through an ASTB, the viewer enters a TV name which is used to identify that viewer's account or identity locally on the ASTB. The viewer also enters a PIN and a service he or she wants to access. This information is then used on the local ASTB to retrieve a UID. The UID along with other information is transmitted over the network to the MSO. The MSO uses the UID to retrieve any information it needs to process the viewer's requests. FIG. 4 is an illustration of data structures used to retrieve information using a UID in accordance with one embodiment of the present invention. A logical representation of a UID and service data is shown as UID table 402 which typically resides in the NID with the MSO. While the data here is shown in the form of a table, other data structures or configurations can be used to store and access the data items described below.

Table 402 is made up of numerous records of variable length. The records can be searched based on UID, stored in column 404. For each UID there are one or more services, such as email, chat, wallet, and so on. Each cell in a record can contain another set of information specific to that service for that viewer. For example, a viewer having a UID of 600×9Y1 has a record 406 in UID table 402. This viewer has access to Email services and electronic wallet services. Other viewers having more services would have longer records including cells for the other services. In the described embodiment, a cell 408 for email services contains a pointer to another set of information shown as grid 410.

Grid or table 410 contains two columns, one for various email login names and another for a corresponding password. There are a number of ways to represent this information. An email login name is stored in one column and a password is stored in a corresponding column. A viewer can have several login names and use the same password for each login. By using the viewer's UID to map to an email service data set or table for that viewer, the viewer can keep several different login names and passwords, and change them when desired. Other information can also be stored in such a table if needed for a particular service, such as different card numbers in an electronic wallet service. The information associated with the viewer contained in grids such as grid 410 and all other information related to the viewer makes up the viewer's network identity which is identified using the viewer's UID. By specifying which services the viewer wants, the system can use the UID and other parameters to validate and provide access for the viewer. In order to get the correct UID, the ASTB uses the viewer's TV name locally to retrieve the UID. The same TV name is also part of the viewer's network identity, stored in the saved ASTB viewer record 310 as described above.

Figure 5:
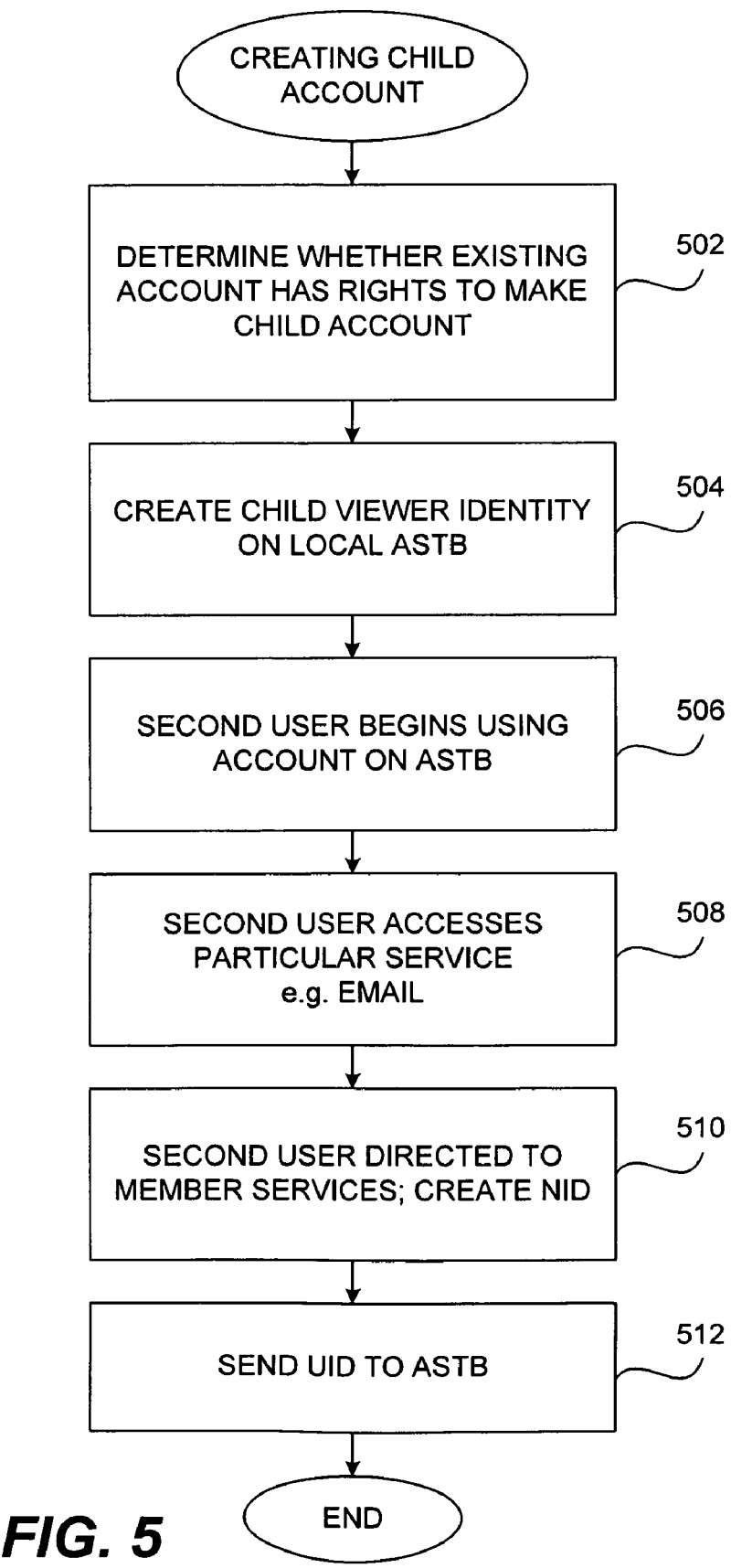
FIG. 5 is a flow diagram of a process of creating a child account from an owner account in accordance with one embodiment of the present invention.

FIG. 5 is a flow diagram of a process of creating a child account from an owner account in accordance with one embodiment of the present invention. Local viewer accounts/identities can be created at any time on the ASTB by an existing viewer account that has privileges to create other accounts. In the described embodiment, once a viewer account and UID are created, they must bind to either an existing NID or create a new NID. A new viewer account would bind to an existing NID if one user wanted to have two or more viewer accounts on different ASTBs. This scenario is shown in FIG. 1 where a single subscriber may have accounts on various ASTBs at different locations. A new NID is created when a new account is created for another user for whom a new UID is also generated.

In the described embodiment, a NID can be created on demand. That is, a NID is created the first time a new viewer, for whom a local account has been created, attempts to access a network service, such as Internet email, but has not yet created or been bound to an existing NID. This is described in greater detail below. In the described embodiment, there are two ways a new viewer identity can be created: creating an owner account when the ASTB is first installed, as discussed above, or creating a child account from an existing account. An owner account is created during the primary provisioning process that occurs on the ASTB when it is installed and the software is loaded. In this case, the subscriber/viewer has previously obtained a registration code from the MSO. When the subscriber first registers with the MSO, he or she is asked to create a primary account. Once the DHCP process is complete and the ASTB is functioning in a two-way environment, the ASTB will attempt to link the subscriber account to the subscriber record in the MSO using the registration code, as described above.

FIG. 5 describes a process of creating a child account and corresponding NID from an existing account. At step 502 of FIG. 5, the ASTB determines whether the viewer of the existing account attempting to make a child account has the rights to make child viewer account. If not, the viewer is denied access to creating a new account and the process is complete. If the viewer does have the rights (e.g. class of service or COS as typically used by MSOs), control goes to step 504 where the subscriber creates a child viewer identity in the local environment on the ASTB. The primary subscriber assigns a particular class of service to the child account which cannot exceed the class of service of the primary subscriber and or be an owner account.

At step 506 the second viewer of the child account uses the account for the first time by logging in and choosing a personal identification number or PIN. At this stage the ASTB has the second viewer's PIN and can use it subsequently to authenticate the viewer on that set-top box. This allows the second viewer to use services local to that ASTB. At step 508 the second viewer attempts to access a network service, such as email, and is directed to a member services component of the MSO by the ASTB. At this stage the new viewer account has not been bound to a NID since it has not been assigned a UID. The UID field in the viewer record is empty. Once in member services, the viewer having the child account is directed to either create a new NID or bind to an existing NID.

In the scenario described here, the new viewer is not the same as the primary viewer and, therefore, a new NID is created. This is performed at step 510 where the new viewer of the child account is directed to a member services page to create a new NID. The new viewer is asked to set preferences, settings, login names, passwords, etc. to create an NID. Once the NID is created for the new viewer, the network generates a UID which is transmitted to and stored in the cached ASTB viewer record at step 512. It is also stored in the NID, specifically in the saved viewer record. Once the ASTB has a new UID for the viewer with the child account, the ASTB can use the UID to map to the NID for the viewer and continue normal use of network services.

In the scenario where an existing viewer wants to use local and network services on another ASTB (i.e., create a second viewer account on another ASTB), it is possible to bind the new local viewer account to an existing NID. This scenario is described and shown in FIG. 1 where a single viewer has numerous viewer accounts on different ASTBs at different locations (although the boxes do not have to be at different physical locations; for example, they can be in different rooms in the same house). This scenario can also occur when a viewer travels to another location and wants to use the services of another ASTB but have the MSO bill the viewer's account and the owner of the remote ASTB. The process of binding a new viewer account to an existing NID is generally the same as the process described above with some differences. Most notably, to bind to an existing NID requires that the viewer knows some unique identifier, such as a password and login name, that identifies a network service (e.g., e-mail login, chat id, etc.). In addition, the viewer should also be able to provide a password or PIN to authenticate the viewer to the network. In another scenario, the viewer can identify himself based on a unique name of an existing ASTB and an identifier for the viewer account on that ASTB, such as the viewer's TV name. In this case, each box would have to be assigned a unique identifier.

As mentioned above, the described embodiment is presented in the context of an ASTB. Other IP clients, such as a Web pad or a PDA, can also be NID-enabled. That is, the user, having a UID, can use the UID-NID abstraction presented above to have, for example, a simple logon name (e.g. "Bob") and one PIN for all services. For example, a simple, intuitive user logon name such Bob (for a user named Bob) can map to bob345@excite.com for email, BigBob@excite.com for chat, and Bob9999@excite.com for wallet services. In addition, since the solution is server-based, whatever IP client Bob uses, he accesses his information via his UID, and any updates or changes are spread to all IP clients.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of mapping two viewer accounts with one network account in a cable TV network, the method comprising:
   creating a first viewer identity on a set-top box, the first viewer identity corresponding to a first set of services for a first IP-enabled device, wherein the first viewer identity stores first viewer preferences and access rights relating to the first IP-enabled device, and wherein the first viewer identity contains a unique identifier that is opaque to a subscriber, not known to the subscriber, and immutable;
   creating a second viewer identity on a mobile phone, the second viewer identity having the unique identifier that is also contained in the first viewer identity, the second viewer identity corresponding to a second set of services for the mobile phone, wherein the second viewer identity stores second viewer preferences and access rights relating to the mobile phone;
   creating a network identity containing the unique identifier that is in the first viewer identity and in the second viewer identity, data on one or more services provided by a cable operator, and a network record storing administrative and access rights of the subscriber;
   mapping the first viewer identity with the network identity; and
   mapping the second viewer identity with the network identity,
   such that the first viewer identity and the second viewer identity map to the same network identity which belongs to one subscriber.

2. A method as recited in claim 1 wherein the network identity contains a subscriber record containing billing and address data of the subscriber.

3. A method as recited in claim 1 wherein the first viewer identity maps to the network identity using the unique identifier.

4. A method as recited in claim 1 wherein the second viewer identity maps to the network identity using the unique identifier.

5. A method as recited in claim 1 wherein the network identity has a network identifier that maps to the unique identifier in the first viewer identity and the second viewer identity.

6. A method as recited in claim 1 further comprising generating the unique identifier on a network-side server.

7. A method as recited in claim 1 wherein the first viewer preferences and the second viewer preferences include data that a viewer can change and that is an be stored by the cable operator.

8. A method of mapping two viewer accounts with one network account in a cable TV network, the method comprising:
   creating a first viewer identity on a set-top box, the first viewer identity corresponding to a first set of services for a first IP-enabled device, wherein the first viewer identity stores first viewer preferences and access rights relating to the first IP-enabled device, and wherein the first viewer identity contains a unique identifier that is opaque to a subscriber, not known to the subscriber, and immutable;
   creating a second viewer identity on a tablet computing device, the second viewer identity having the unique identifier that is also contained in the first viewer identity, the second viewer identity corresponding to a second set of services for the tablet computing device, wherein the second viewer identity stores second viewer preferences and access rights relating to the tablet computing device;
   creating a network identity containing the unique identifier that is in the first viewer identity and in the second viewer identity, data on one or more services provided by a cable operator, and a network record storing administrative and access rights of the subscriber;
   mapping the first viewer identity with the network identity; and
   mapping the second viewer identity with the network identity,
   such that the first viewer identity and the second viewer identity map to the same network identity which belongs to one subscriber.

* * * * *